United States Patent [19]
Ford

[11] Patent Number: 5,453,103
[45] Date of Patent: Sep. 26, 1995

[54] RECLAIMING AND UTILIZING DISCARDED AND NEWLY FORMED COKE BREEZE, COAL FINES, AND BLAST FURNACE REVERT MATERIALS, AND RELATED METHODS

[75] Inventor: George W. Ford, Jr., Salt Lake City, Utah

[73] Assignee: Environmental Technologies Group International, Inc., Price, Utah

[21] Appl. No.: 184,099

[22] Filed: Jan. 21, 1994

[51] Int. Cl.$^6$ ........................................................ C10L 5/02
[52] U.S. Cl. .............................. 44/553; 44/591; 44/592; 44/607; 44/634; 44/551
[58] Field of Search .............................. 44/553, 551, 591, 44/592, 607, 634

[56] References Cited

U.S. PATENT DOCUMENTS

| | | | |
|---|---|---|---|
| 1,966,553 | 7/1934 | Kropp | 44/553 |
| 3,836,343 | 9/1974 | Romey et al. | 44/553 |
| 4,586,936 | 5/1986 | Schaffer et al. | 44/592 |
| 5,244,473 | 9/1993 | Sardessai et al. | 44/553 |

Primary Examiner—Jacqueline V. Howard
Attorney, Agent, or Firm—Foster & Foster; Lynn G. Foster

[57] ABSTRACT

A method and a solid fuel product, such as briquettes and pellets, comprising carbon fines, in the form of heretofore discardable coke breeze and/or coal fines and/or revert materials, bound together chemically into smaller pieces to substantially prevent degradation and which constitutes a source of high heat without creating significant pollution or smoke.

11 Claims, 1 Drawing Sheet

RECLAIMING AND UTILIZING DISCARDED AND NEWLY FORMED COKE BREEZE, COAL FINES, AND BLAST FURNACE REVERT MATERIALS, AND RELATED METHODS

FIELD OF THE INVENTION

The present invention relates generally to coke breeze, coal fines, and blast furnace revert materials, and, more particularly, to the elimination of coke breeze, coal fines, and blast furnace revert materials, as discarded, pollution causing by-products and the processes and products by which these materials are constructively utilized.

BACKGROUND

In the past, coke breeze (produced as a by-product of coke production), coal fines (produced as a by-product of coal mining per se) and blast furnace revert materials (produced as a by-product of steel production) have been routinely discarded, in large quantities, creating a source of pollution and presenting a fire hazard which continues for decades.

Coke is a pure carbon, high heat, clean burning fuel used primarily in steel-making blast furnaces and other industrial applications. It is made from metallurgical grade coal which is heated in the absence of air in large ovens. Volatile matter is driven off the coal, leaving pure carbon. Small pieces of coke, known as coke breeze or coke fines, are a waste product of the coke-making process. Coke breeze has, for years, been accumulated as a waste product from the above-described process by which coke is manufactured. Stockpiles of waste coke breeze are unsightly and constitute an ever enlarging source of environmental pollution.

Coke breeze per se is not suitable for use in blast furnaces because of its small size and, consequently, is of little or no value to the steel manufacturer.

Coal fines, similarly, are small coal particles ranging from less than one quarter of one inch in diameter to dust size which are created during coal mining operations. Coal fines are available in abundance worldwide and have historically been simply accumulated in piles at various locations, presenting a disposal problem for coal producers as well as a fire hazard. Typically, coal fines are disposed of at or near the mine site in piles or trenches, creating actual and potential environmental problems.

Blast furnace revert material comprises mill scale, dust and sludge derived from the production of steel, which contains a large amount of non-oxidized combustible particles or pieces. This material also has over the years been discarded and stored as ugly piles of useless material which presents environmental and fire hazard problems, both actual and potential.

Disposal of coke breeze, coal fines, and revert material has been a long-standing problem of substantial proportions. Similarly, providing a useful purpose and useful form for coke breeze, coal fine, and/or revert materials has been a major long-term problem for which, prior to the present invention, a satisfactory solution has not been found. Prior attempts to place coke breeze, coal fines, and/or revert materials in a solid form, such as briquettes, has been largely unsuccessful because the product does not adequately bind and is instable, disintegrating or retrogressively degrading back into small, fine particles during storage and handling prior to use.

BRIEF SUMMARY AND OBJECTS OF THE PRESENT INVENTION

In brief summary, the present invention overcomes or substantially alleviates the above-identified problems of the prior art. A method and solid product, in the form of briquettes and/or pellets, are provided comprised of coke breeze and/or coal fines and/or revert materials bound together to substantially prevent degradation into smaller pieces. The briquettes provide a source of fuel and heat, which is clean burning, and substantially smokeless and which alleviates a long-term, existing and on-going pollution problem.

With the foregoing in mind, it is a primary object of the present invention to overcome or substantially alleviate all or some of the problems of the prior art mentioned above.

Another object of significance is the provision of a novel method and a relatively large solid product comprised of non-degradable coke breeze and/or coal fine and/or revert materials substantially bound together so that the solid nature of the product does not degrade with time.

A further important object is the provision of a novel method of producing a relatively large solid fuel product and the fuel product itself, which is clean burning and substantially smokeless.

An additional dominant object is to provide a method and relatively large, solid product which does not degrade and which alleviates an existing on-going source of pollution.

It is a further principal object of the present invention to provide a method and relatively large solid product derived from recycled waste material produced in the course of coal mining, coke production operations, and/or steel production by which a high value fuel product, which is commercially viable, is obtained.

An additional valuable object is the provision of briquettes or pellets derived from coke breeze and/or coal fines and/or revert materials suitable for many industrial and non-industrial applications including steel making blast furnaces and household fireplaces and woodburning stoves.

It is a further dominant object according to the present invention to provide a solid fuel derived from waste materials which is durable, is clean burning, retains its BTU heat value, is economical to produce, and is suitable for a variety of industrial and non-industrial purposes.

It is a further object of the present invention to provide a novel method and relatively large solid product formed by mixing of coke breeze and/or coal fines and/or revert materials with a novel binding agent.

A further significant object is the provision of a recycle method and recycle relatively large solid product which eliminates or alleviates a long-standing environmental problem, transforming waste material into a viable fuel product.

A further paramount object of the present invention is the provision of a novel method and solid fuel product which, when burned in stoves and fireplaces does not cause appreciable air pollution.

A further object of the present invention is the provision of a novel method and solid product comprising coke breeze and/or coal fines and/or revert materials bound together such that neither the coke breeze nor the coal fines nor the revert materials nor the binding agent releases harmful emissions during combustion or incineration.

A further valuable object of the present invention is the provision of a novel method and unique solid fuel product comprising coke breeze and/or coal fines and/or revert materials bound together in such a way that utilization thereof industrially, such as in a blast furnace, or otherwise does not produce emissions in violation of permissible limits.

It is a further object of the present invention to provide a novel method and unique solid fuel product from raw materials heretofore treated as waste which produces little ash and essentially no creosote during combustion or incineration.

A further primary object is the provision of a novel method and unique solid fuel product formed from waste which has a high BTU value.

These and other objects and features of the present invention will be apparent from the detailed description taken with reference to the accompanying drawings.

DETAILED DESCRIPTION OF THE ILLUSTRATED EMBODIMENTS

EXAMPLE 1

Figure 1:
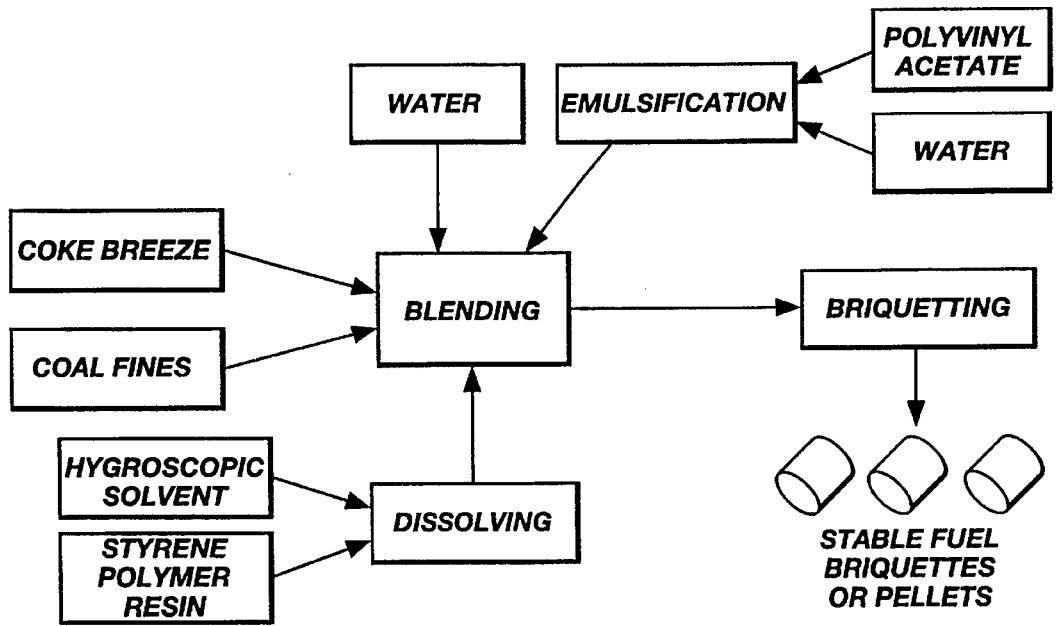
FIG. 1 is a flow chart of one process by which a solid, relatively large fuel product, in the form of briquettes or pellets, for example, is formed in accordance with the principals of the present invention.

With reference to FIG. 1, two hundred pounds (200 lbs.) of wet coal fines were introduced into a blender. The water content was measured at thirty percent (30%) by weight. Thus, the mix was relatively dry. The material was blended until the coal fines were evenly distributed in the water. Mixing continued for approximately ten (10) minutes is normally suitable. An ample amount of carbonic acid is derived from the coal to establish a pH value which accommodates the binding effect described below.

A hygroscopic solvent (methyl ethyl ketone) into which a ten percent (10%) by volume styrene polymer resin had been dissolved, was then added to the blender at the level of seven percent (7%) by weight. The material in the blender was blended until even distribution of the doped solvent throughout the coal fines and water mixture was achieved. About ten (10) minutes is usually suitable.

A twelve percent (12%) by weight polyvinyl acetate and water emulsion was then added to the mixture and blended until the mixture was homogenous. The resulting mixtures were then pressed into briquettes, using a conventional briquette machine at an injection pressure of 3,000 psig.

EXAMPLE 2

With continued reference to FIG. 1, the above-described process was repeated with dry coke breeze. A lesser amount of water was needed to create a coke breeze-water mixture from which solid briquettes can be derived.

Approximately ten percent (10%) water by weight was added to the dry coke breeze and mixed until homogenous (on the order of ten minutes). The steps as described in Example 1 above were then repeated and hard briquettes were formed in a briquette machine at the end of the injection pressure step.

Theory

While it is not certain, perhaps the present invention polymerizes the carbon particles contained in the coke breeze and coal fines waste materials into a new long chain polymer compound, yet unidentified, which provides structurally superior briquette or pellet strength over the prior art. It is known that oxides of carbon will hydrolyze in water. This reaction leaves free carboxyl ions present in the compound.

Introduction of the doped methyl ethyl ketone is believed to allow for attachment of the styrene polymer to the free carbon ions by exchange of the polymer for water which is absorbed into the solvent.

In the next phase, polyvinyl acetate is introduced into the slurry. Again the presence of the methyl ethyl ketone acts as a catalyst to remove and allow the styrene to react to the polyvinyl acetate. That an exothermic reaction was taking place was evidenced by the rise in temperature of approximately 15° F. above ambient during the time that the briquettes were curing.

The resulting solid fuel product, such as briquettes and/or pellets, is structurally stable and does not retrogress into fine particles during storage and handling. The solid fuel product is bound reliably together and constitutes high BTU fuel for industrial and residential which does not materially pollute the air because it is clean burning.

EXAMPLE 3

Figure 2:
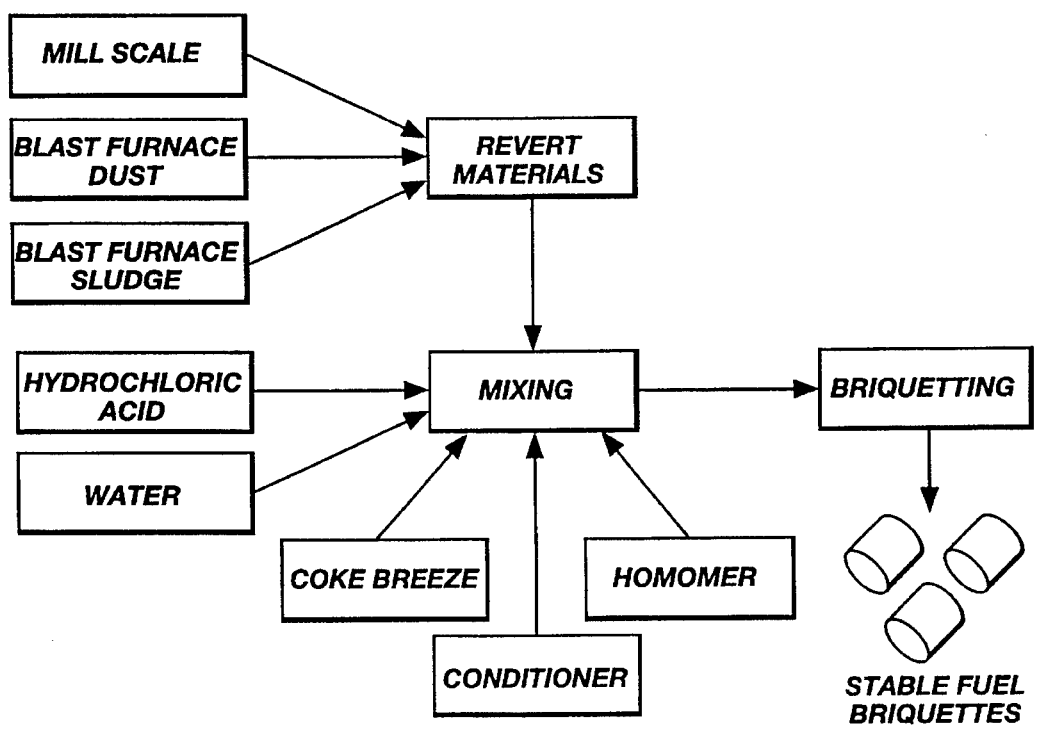
FIG. 2 is another flow chart of another process by which a solid, relatively large fuel product is formed in accordance with the principles of the present invention.

With reference to FIG. 2, equal amounts of blast furnace dust and blast furnace sludge were combined with hydrochloric acid in water. The dust and sludge, respectively comprised thirty-nine percent (39%) by weight of total ingredients of the ultimate mixture, exclusive of water. This ratio was arbitrarily chosen. Hydrochloric acid comprised four percent (4%) and a quantity sufficient of water, usually eight percent (8%) by weight was added. This initial mixture was blended for on the order of ten (10) minutes.

The hydrochloric acid adjusts the pH to accommodate the required binding of the particles of revert material by which an anti-degradable solid fuel is obtained.

Coke breeze in the amount of ten percent (10%) by weight was added to the initial mixture and combination mixed in the blender for an additional two (2) minutes to homogeneously disperse the coke breeze. While not essential to a solid fuel product for residential and like uses, the coke breeze does as a spline to hold the ultimate product together and accommodates use as a high temperature source for use in blast furnaces. For use other than in blast furnaces and the like, coal fines can be used in lieu of coke breeze.

Thereafter, a conditioner in the amount of three percent (3%) by weight was added to the twice blended mixture to attach acrylonitrile polymer to the material of the mix and blending continued for an addition five (5) minutes. Methyl ethyl ketone is combined with the acrylonitrile as a solvent carrier to prevent premature setting and to act as a cleaner. Homopolymer in the amount of five percent (5%) by weight was next added and mixing continued for five (5) more minutes. The homopolymer acts with the acrylonitrile to enhance binding of the carbon-containing materials into an anti-degradable solid fuel product.

The resulting briquette material is continuously mixed as it is fed in a conventional fashion to a standard briquette machine where the briquettes are formed under pressure.

The briquettes do not deteriorate with time and are clean burning in stoves, fireplaces, and blast furnaces.

The amount of water added to the mixture may be varied depending upon the moisture content of the respective material from which the briquette mix is formed. While this and other examples show a mix of materials to be reclaimed, it is to be appreciated that any one of the discarded materials can be used exclusively or, in the alternative, in conjunction with one or more other carbon-bearing discarded materials in the formation of high heat and low pollution briquettes or the like, which do not degrade with time.

The presently preferred homopolymer material is 32-024 homomer Polyvinyl acetate emulsion, available from National Starch and Adhesive. The presently preferred conditioner is acrylonitrile polymer retained in a prolonged fluid state by methyl ethyl ketone. Acrylonitrile polymer is available from Polymerland and Ballard Medical Products. Technical grade methyl ethyl ketone, available from Dice Chemical Co. and Thatcher Chemical Co., is preferred. Ninety percent (90%) by weight methyl ethyl ketone and ten percent (10%) by weight acrylonitrile polymer is suitable, although these amounts can be varied.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of forming solid fuel pieces from material comprised of waste carbon selected from the group consisting of coke breeze, coal fines, and revert materials comprising the steps of:

combining the carbon material with water, hydrochloric acid, a conditioner, and a homomer;

selectively mixing the above-mentioned ingredients;

compressing the resulting mixture into solid fuel pieces.

2. A method according to claim 1 wherein the combining step comprises placing the carbon material, the water, and the hydrochloric acid together and mixing long enough to obtain a well blended mix.

3. A method according to claim 2 wherein the combining step further comprises adding additional carbon material to the mix after the placing and mixing steps and further mixing the combined ingredients to obtain a well blended mix.

4. A method according to claim 2 wherein placing step comprises placing revert material in the water and hydrochloric acid.

5. A method according to claim 3 wherein the placing step comprises placing blast furnace dust and blast furnace sludge in the water and hydrochloric acid and the adding step comprises adding coke breeze to the mix.

6. A method according to claim 1 wherein the conditioner comprises acrylonitrile in combination with methyl ethyl ketone.

7. A method according to claim 1 wherein the combination comprises about 90% methyl ethyl ketone and about 10% acrylonitrile polymer by weight.

8. A method according to claim 1 wherein the homomer comprises homomer PVAC emulsion.

9. A method according to claim 1 wherein the conditioner is added to the mix after the carbon material, the water, the hydrochloric acid, and the homomer and after substantial mixing of those ingredients.

10. A method of forming solid fuel pieces comprising the steps of:

combining blast furnace dust and blast furnace sludge with or without mill scale with water and hydrochloric acid;

mixing the aforesaid combination of ingredients until the mix is well mixed;

adding coke breeze and further mixing until well dispersed;

adding a conditioner comprised of methyl ethyl ketone and acrylonitrile polymer and further mixing until well dispersed;

adding homomer and further mixing until well dispersed;

compressing the completed mix into solid fuel pieces before the mix is set;

allowing the solid fuel pieces to set and cure thereby alleviating later deterioration.

11. A method according to claim 10 wherein the completed mix exclusive of water comprise by weight about 39% blast furnace dust, 39% blast furnace sludge, 4% hydrochloric acid, 10% coke breeze, 3% conditioner, and 5% homomer.

* * * * *